Jan. 2, 1923.

J. J. SIEROSLAWSKI.
NUT LOCK.
FILED FEB. 20, 1922.

1,440,938.

Inventor
J. J. Sieroslawski.

By
Lacey & Lacey, Attorneys

Patented Jan. 2, 1923.

1,440,938

UNITED STATES PATENT OFFICE.

JOHN J. SIEROSLAWSKI, OF HAZLETON, PENNSYLVANIA, ASSIGNOR OF ONE-HALF TO ANTHONY S. SIEROSLAWSKI, OF McADOO, PENNSYLVANIA.

NUT LOCK.

Application filed February 20, 1922. Serial No. 537,917.

*To all whom it may concern:*

Be it known that I, JOHN J. SIEROSLAW-SKI, a citizen of the United States, residing at Hazleton, in the county of Luzerne and State of Pennsylvania, have invented certain new and useful Improvements in Nut Locks, of which the following is a specification.

This invention relates to nut locks and has for its object the provision of a simple, inexpensive and efficient device whereby premature or accidental release of a nut from a bolt will be prevented but removal of the nut may be readily effected when separation of the secured parts is desired. The invention is illustrated in the accompanying drawings and will be hereinafter fully set forth.

In the drawings—

Figure 1:
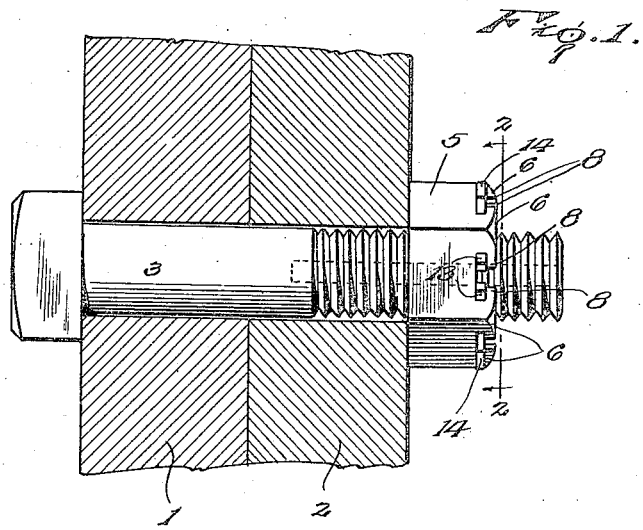
Figure 1 is an elevation of a nut and bolt having my improved lock applied thereto and showing the bolt inserted through parts to be secured together.

In the drawings, the reference numerals 1 and 2 indicate two timbers which are to be held together by a bolt 3. The bolt may, of course, be of any dimensions required by the work to be performed and in the threaded portion of the bolt is formed a longitudinal groove 4. The nut 5 is mounted upon the bolt in the usual manner and may be hexagonal or square or of other polygonal outline. On the outer face of the nut, I provide a plurality of T-shaped projections 6 which are spaced equi-distantly around the nut and are located at the angles or corners of the nut, as shown clearly in Figs. 2 and 3. The ends of the lugs or projections overhang the face of the nut, and the inner edges of the lugs or projections are spaced from the threaded bore of the nut. This arrangement presents a series of radial grooves 7 having overhanging flanges 8 at the outer ends of their side walls, the surface of the nut around the bore and between the same and the shanks of the lugs forming a seat for a locking washer 9. The said washer consists primarily of a split ring having an inwardly projecting tooth or lug 10 on its inner circumferential edge at a point diametrically opposite the split 11, and the ring is preferably reduced in thickness, as indicated at 12, at each side of the said tooth 10 in order to increase the pliability or expansibility of the same. Extending radially outward from the split ring at the sides of the split are projections 13 which constitute locking members and also serve as handles, as will presently appear, and at points intermediately between the said projections 13 and the tooth 10 are lugs 14 which project radially outward from the outer circumferential edge of the ring.

Figure 2:
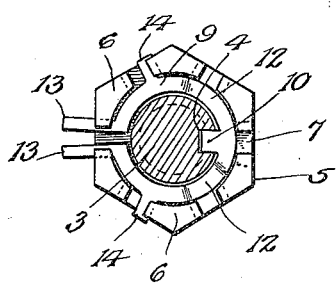
Fig. 2 is a detail section on the line 2—2 of Fig. 1.
Figure 3:
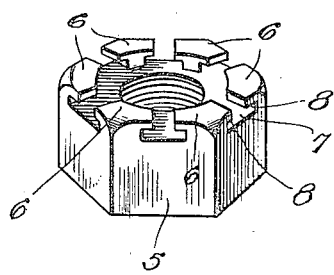
Fig. 3 is a detail perspective view of the nut.
Figure 4:
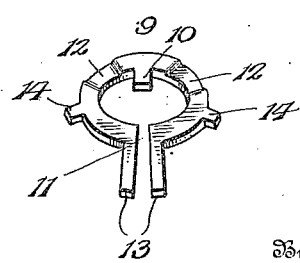
Fig. 4 is a detail perspective view of the locking washer.

In the use of the invention, the nut is turned home upon the bolt in the usual manner and, after being turned home, may be slightly released so as to bring one of the grooves 7 into alinement with the longitudinal groove 4 of the bolt if such backward turning is necessary. This reverse movement of the nut will not be sufficient to permit the release or separation of the members 1 and 2 which are to be secured inasmuch as one of the said grooves 7 will open through each side of the nut and in most cases, when the nut is fully turned home, one of said grooves will register with the groove in the bolt. If such alinement of the grooves does not occur, an exceedingly slight reverse movement will effect the desired registration. The elongated lugs 13 are then grasped by pliers so that the split ring will be compressed sufficiently to permit it to be slipped over the end of the bolt with the tooth 10 in engagement with the groove 4 of the bolt and the lugs 13 and 14 registering with the spaces between adjacent lugs 6 on the nut. The washer is then slipped longitudinally of the bolt until the lugs 13 and 14 pass between the lugs 6 on the nut, whereupon the washer is released, and by its own resiliency will expand so that the lugs 13 and 14 will engage under the flanges 8 on the respectively adjacent lugs 6, as will be readily understood. Obviously, when the washer is thus engaged, as shown in Fig. 2, turning of the nut independent of the bolt cannot occur. If, however, it be desired to release the nut, the lugs 13 are again engaged by the pliers and forced together so that the ring or washer will be contracted or compressed and this contracting or compressing action will withdraw the lugs 13 and 14 from under the lugs 6 engaged by them so that they may then pass through the spaces between the lugs. It will be readily noted that in its expansion or contraction, the washer or split ring will remain relatively stationary at the lug 10, but its ends will move together or apart in a more or less pivotal action having the lug 10 and the adjacent part of the washer or ring as the center of movement. The lugs 13 and 14 will, consequently, be caused to move in a plane parallel with the face of the nut and, therefore, will move under the overhanging flanges 8 or into alinement with the spaces between said flanges, as will be readily understood. My improved nut lock is exceedingly simple and may be applied to any structure in which it is desired to prevent accidental or premature release of a nut from the bolt engaged by it, and, when the lock is in position, it will positively and effectually prevent turning of the nut or bolt independently one of the other.

Having thus described the invention, what is claimed as new is:

1. The combination of a bolt having a longitudinal groove, a nut provided upon its outer face with an overhanging lug and an expansible locking washer seating upon the face of the nut and provided with a tooth to engage the groove in the bolt and an outwardly projecting lug to engage under the lug on the nut, the washer being reduced in thickness at the sides of the said tooth.

2. The combination with a bolt having a longitudinal groove, and a nut mounted upon the bolt and provided upon its outer face with spaced lugs, said lugs having overhanging flanges on their opposed sides, of a split ring adapted to seat against the outer face of the nut around the bore of the same and provided with an inwardly projecting tooth to engage the groove in the bolt and outwardly projecting lugs to engage under the overhanging flanges of the lug on the nut.

3. The combination with a bolt having a longitudinal groove, and a nut mounted upon the bolt and provided on its outer face with a plurality of lugs spaced from the bore of the nut and having overhanging flanges at their opposed sides, of a split ring adapted to seat against the nut around the bolt and provided with an inwardly projecting tooth to engage the groove in the bolt and a plurality of outwardly projecting lugs adapted to pass through the spaces between adjacent lugs on the nut and engage under the overhanging flanges on said lugs, the lugs at the split in the ring being elongated to serve as handles.

4. The combination with a bolt having a longitudinal groove, and a nut fitted upon the bolt and provided in its outer face with a plurality of lugs spaced from the bore of the nut and constructed at their opposed edges with overhanging flanges, of a split washer provided on its inner circumferential edge with a tooth to engage the groove in the bolt and provided on its outer circumferential edge with radial lugs adapted to pass through the spaces between adjacent lugs on the nut and engage under the overhanging flanges on said lugs, the washer being reduced in thickness adjacent and at the opposite sides of the inwardly projecting tooth and some of the radially projecting lugs being disposed immediately at the sides of the split in the washer and elongated to serve as handle members.

In testimony whereof I affix my signature.

JOHN J. SIEROSLAWSKI. [L. S.]